United States Patent Office 2,863,736
Patented Dec. 9, 1958

2,863,736
DEVICE FOR ANALYSIS OF GASEOUS MIXTURES

Günter Axt, Karlsruhe, Germany, assignor to Hartmann & Braun Aktiengesellschaft, Frankfurt am Main, Germany, a corporation of Germany Application March 27, 1956, Serial No. 574,311

Claims priority, application Germany April 1, 1955

16 Claims. (Cl. 23—254)

Systems are known for the analysis of gaseous mixtures in which the gas mixture is brought in contact with circulating reactive liquid followed by reaction between a component of the gas mixture and the reaction liquid manifesting a temperature change or change in conductivity of the reaction liquid, which change is measured for determining the content of the gas.

The measuring arrangement contains a reaction tube at one end of which are the gas inlet and the inlet for the reaction liquid. The reaction between the gas and the liquid takes place in the tube and after their exit from the tube, the gas and reaction fluid are again separated. If the conductivity of the liquid before and after reaction serves as the measuring value (conductivity process) a senser is used in the form of a pair of electrodes in the reaction liquid inlet and another pair in the liquid outlet. The electrodes are connected to a source of voltage and connected respectively with each other so that the difference in conductivity at the two electrode pairs is directly measured as the value of the content of the determined component of the gas mixture. If a change of temperature as a result of reaction be measured (temperature process) then conventional temperature sensers may be used, such as a thermocouple having the warm junction at the reaction tube while the cold junction might be adjacent reaction liquid or the gas mixture in question before reaction.

In both cases it is necessary that gas and reaction liquid be kept at as near the same temperature as possible before entering into the reaction tube. This condition is obtained by allowing the gas and reaction liquid to mutually exchange heat before their entrance into the reaction tube. Moreover it is desirable that fluctuations of the surrounding temperature not influence the measuring arrangement or device unevenly. Such devices were hitherto enclosed in a good heat conductive metal case. This had the disadvantage in that complicated and fragile connections of tube and flexible pipe were necessary.

This disadvantage in such arrangements for the analysis of gas mixtures, in which the mixture comes in contact with a circulating liquid in a reaction tube with a resultant reaction altering physical properties of the liquid which are measured, is overcome in the present invention. In this invention the reaction tube, its gas inlet tube and its reaction liquid inlet tube along with the senser or detector are combined into a complete unit meter, the latter being disposed in the supply vessel for the reaction liquid and within the liquid. A strong and compact arrangement is obtained which enables greater advantages as later described.

Figures 1, 2, 3:
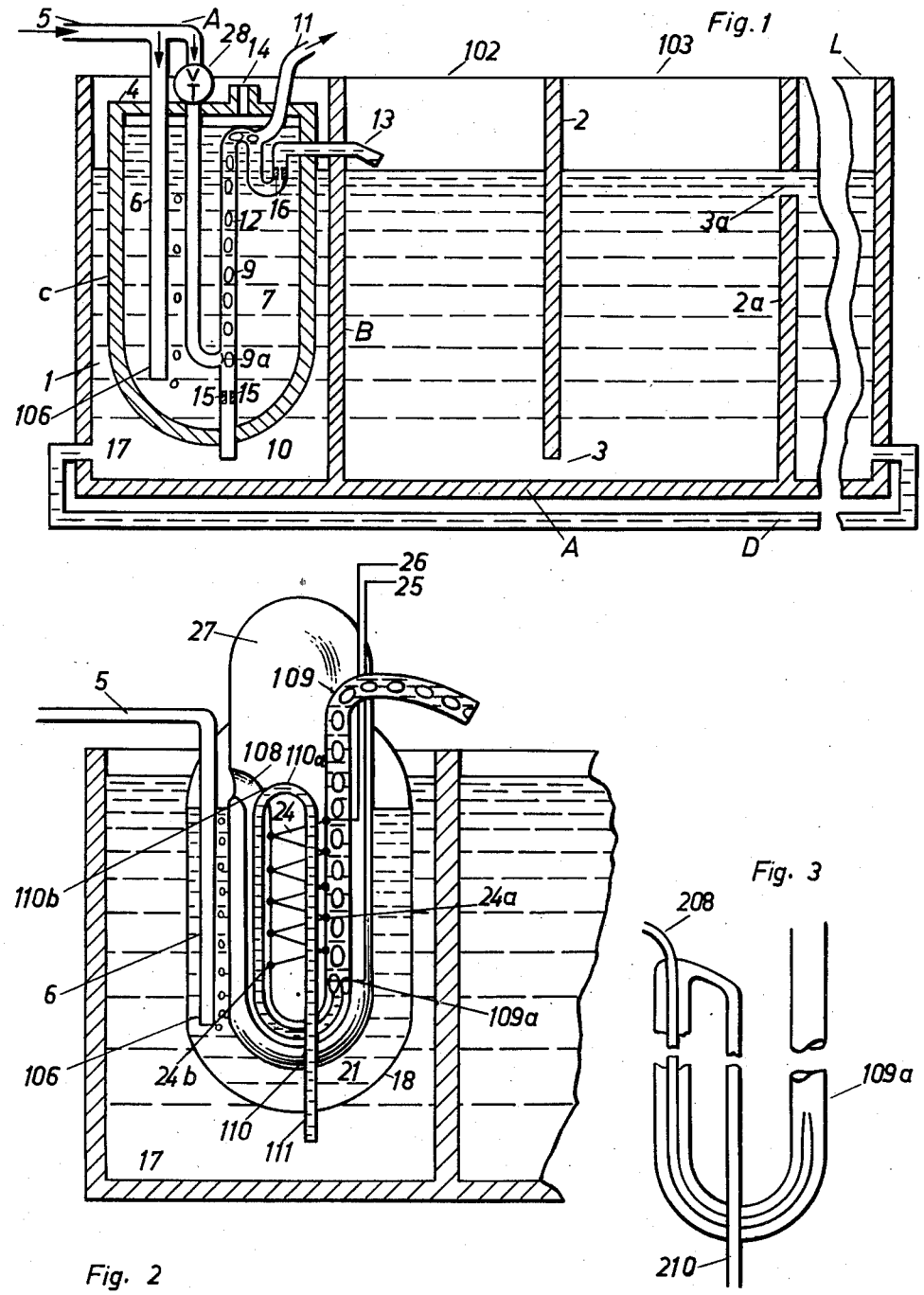
Fig. 1 is a sectional view of the invention wherein conductivity of the reaction liquid is used as a measure of gas content.
Fig. 2 is a similar view showing the invention wherein temperature change is used as a measure of gas content.
Fig. 3 shows a modification of the invention as shown in Fig. 2.

In Fig. 1 a container A is provided with a compartment or cell 1 containing a fresh reaction liquid 17 capable of reaction with a component in question contained in the gas mixture so as to alter a physical value or property of the reaction liquid. For example only, the reaction liquid may be water and the gas component be hydrogen chloride. The liquid passes, according to later description of the invention, on to other cells.

In the compartment 1 (left in Fig. 1) the metering unit generally designated C, is immersed in the fluid 17. The unit C includes a housing or container 4 in which is disposed a vertical reaction tube 9 provided in its lower portion with an inlet opening 9a for the entry of the gas mixture in question from the inlet conduit 8, connected to the main gas stream pipe 5.

The inlet 9a is above the lower end portion 10 of the tube which projects into the liquid 17, the portion 10 serving as a liquid inlet. Entry of the gas into the vertical tube causes the liquid to flow upwardly in the tube in a manner as in the well known air-lift because of the presence of some non-reactive gas.

At the upper end of the tube 9 the gas separates from the entrained or raised reaction liquid after which the gas is led off through the outlet duct 11, the lifted liquid collecting in a U tube 12 and being led off through a short tube 13. In the fluid inlet portion 10 there are disposed a pair of electrodes 15, and on the U tube 12 are a second pair for indicating the measured value. By means of these electrode pairs, which pass through the tube walls, the conductivity of the reaction liquid is measured before and after reaction. Both electrode pairs are connected with respect to each other in a manner (not shown) to a source of current (not shown) so that the difference in conductivity of the liquid in the two zones indicates directly the gas content to be measured.

The above mentioned parts are contained in the housing 4 which is partially immersed in the reaction liquid 17 and contains a non-conductive liquid 7, such as oil, almost filling the housing. The resultant oil bath prevents a temperature gradient between the electrode pairs 15 and 16. The oil bath is especially advantageous for other reasons next described. A dip tube 6, connected to the main gas stream pipe 5 projects down into the oil almost to the bottom of the housing 4 and serves in a known manner to keep the pressure on the gas in inlet tube 8 substantially constant. Flow in the tube 8 may be varied by a throttle 28. In this invention the dip tube 6 has a further advantage in that gas issuing from its lower end at the bottom of the housing, and then on out the opening 14 at the top, agitates and stirs the oil so that it is kept throughout at constant temperature, particularly at the electrode pairs 15 and 16.

The null point of the means for measuring conductivity at the electrode pairs can be controlled in a known manner such as by a flow meter for the control of the speed of the incoming gas stream, as well as an apparatus for exit gases.

For an objection-free working of such apparatus it is important that the reaction liquid flow proportionately in a stream through the reaction tube. This condition is attained since the motion or conveying of the reaction liquid is effected by the gas in question. Being as the gas is kept at constant pressure and since the difference in height between the surface of the reaction liquid and the area of gas-liquid contact is constant, the liquid flows steadily through the tube.

The type of conveyance or transport of the reaction liquid is known but heretofore the spent reaction liquid was allowed to return immediately and directly to the stock tank. This meant that the liquid in the stock tank became gradually contaminated. Further developments of this invention enable this disadvantage to be avoided, Thus the stock tank A is additionally divided into many more compartments or cells 102, 103, by a series of partitions 2, and 2a etc., the drawing fully showing only two cells completely. The spent reaction fluid flows from pipe 13 to an adjacent cell 102. The cells are in communication with one another through openings 3 and 3a respectively in the lower and upper portions of alternate partitions 2 and 2a. As a result the boundaries between the fresh and spent reaction liquid from the reaction zone are displaced through the total number of cells before returning to the reaction zone.

In Fig. 1 the tube 13 is shown for the used liquid when its specific gravity is less than for the fresh reaction liquid. After starting, a layer of spent liquid floats on the surface of fresh liquid in cell 102 always becoming thicker until it reaches the bottom of that cell, that is, all contained fresh liquid in this cell has passed through opening 3 into the next cell 103. After that the spent liquid forces into the cell 103, rises in this one toward the top, passes through opening 3a, and begins to sink in layers in the next cell from top to bottom. This goes on until finally the cycle is completed and the spent liquid reaches the compartment 1, via the return duct D connecting the last cell L with compartment 1.

When this condition is reached, the compartment 1, and indeed all cells, must be filled with fresh reaction liquid since even in the cells in which no layering occurs the fresh liquid is displaced considerably by the spent liquid flowing through it.

If the spent liquid is heavier than the fresh then it sinks in the second cell 102 forming layers in the cell 103 from bottom to top and so on. The arrangement of the opening 3 and 3a in such a way that one of the two cell openings lies at the top and one at the top of the liquid enables the use of the instrument whether the spent liquid is heavier or lighter than the fresh reaction liquid. It has been established by tests that in both cases the liquid becomes about ⅔ exhausted.

If only one of the two possibilities is to be considered then all the hole openings might be at the bottom as at 3 or at the top of the partitions as at 3a according to whether the spent liquid is lighter or heavier than the fresh reaction liquid.

In Fig. 2 there is shown another type of vessel for the reaction liquid 17 and it is located as in Fig. 1. It too is shown in the reaction liquid 17, though it operates by temperature alteration of the liquid upon reaction.

The reaction tube is shown as 109. The gas mixture under question is brought to the tube at its lower end 109a by the partially U-shaped gas inlet tube 108, and the reaction liquid by liquid inlet tube 110. They are so arranged for heat exchange that the temperature of the gas and reaction liquid are at as nearly equal temperature as possible at their entrance into the reaction tube.

Thus as shown in Fig. 2 the double looped liquid tube 110 is provided with a lower inlet portion 111 and an upper part 110a which enters the gas tube at 110b. The tube 110 then passes coaxially with the gas tube 108 downwardly and upwardly until reaching the lower end 109a of reaction tube 109. Conversely, the gas tube may be within the liquid tube 210 and terminate at the lower end 109a of the reaction tube zone as in Fig. 3. Movement of the liquid is the same as in Fig. 1.

The measured value in the invention as shown in Fig. 2 is the differential between the temperature of the reaction tube 109 and that of the gas inlet tube 108 or the liquid inlet tube 110. To determine this differential a thermopile 24 is provided having the hot thermocouple junctions 24a at the reaction tube while the cold junctions 24b are at the gas inlet tube 8. These junctions are secured on the glass tubes by melting powdered glass as a welding material. The conductor leads 25, 26 from the thermopile are connected to an indicating instrument (not shown).

In instruments of this kind based on the temperature effect it is very important that no heat exchange occur between points of measurement, such as the reaction tube 109 and the gas inlet 108. In the prior art this was accomplished by having heat insulating material such as cotton wool padding between these parts. In the present invention better heat insulation is obtained by enclosing the components in an evacuated shell 27 with appropriate provision for the passage of the mentioned tubes and conductor leads therethrough.

A further point to be considered in the operation of the temperature differential instrument is that the gas mixture to be analysed becomes so dried or wet with fluid that its partial water vapor pressure, if the reaction liquid is aqueous, is the same as when over the reaction liquid so that when the gas and reaction liquid are brought together, there is no condensation or evaporation.

The invention claimed is:

1. In a gas analyser, a tube member having a U-shaped portion including legs and a yoke part, the legs being vertical; a liquid inlet member for one leg at the yoke part above the lowest point of said portion and in communication with the interior of said leg; means connecting the second leg of the tube to a source of the gas to be analysed, for gas lift action in the said one leg above said point; said member having an open end below said point for dipping into a reactive liquid; means for detecting a physical change in the liquid as it passes upwardly through said one leg, and a container surrounding the tube member and the two mentioned means and containing a second liquid for tending to prevent differences between the incoming and outgoing reaction liquid in at least one physical aspect as the liquid passes through the one leg, said liquid inlet member passing liquid-tight downwardly through said container.

2. In a gas analyser as claimed in claim 1, said physical change being a change in electrical conductance and said aspect being temperature.

3. In a gas analyser as claimed in claim 1 said physical change being a change in temperature and said aspect being heat content due to merely phase changes of state of the same material.

4. In an analyser as claimed in claim 3 said member having a portion within said second leg for heat exchange between the liquid in the inlet member and gas in the second leg.

5. With an analyser as claimed in claim 1, a cell for the reactive liquid, said container being disposed in said cell so as to be at least partially immersed in the reaction liquid.

6. In a gas analyser as claimed in claim 1, and means for passing at least a portion of said gas through the second liquid in contact therewith to aid in preventing said differences.

7. A gas analyser comprising a plurality of liquid-holding compartments substantially at a common level serially connected at alternate bottom and upper portions of adjacent compartments; a return duct connecting terminal compartments of the series; a gas-lift pump for transferring liquid from the lower part of one compartment to the upper part of another compartment; said pump having a gas inlet member adapted to be connected to a source, under pressure, of the gas to be analysed; said compartments being adapted to contain a liquid reactive with the component in question of the gas; and means for indicating extent of reaction of the component and liquid as the gas and liquid pass through the pump.

8. An analyser as claimed in claim 7, said pump having liquid inlet and outlet ducts, and said means including two pairs of electrodes in the respective ducts for use in determining a change of electrical conductivity of the liquid upon passing through the pump.

9. An analyser as claimed in claim 7 said means comprising means for equalizing the temperatures of the gas and liquid before entering the pump, and a differential thermometer for indicating the difference in temperatures of the gas and liquid before and after passing through the gas-lift pump.

10. An analyser as claimed in claim 7, said pump being in a liquid-tight container within a compartment and is at least partially immersed in the liquid in the compartment, the container containing a temperature-equalizing liquid, the container separating the latter from the liquid reactive with the said component, said pump being provided with a liquid inlet duct passing liquid-tight downwardly through the container.

11. In a gas analyser, gas-lift means having a gas-inlet member and inlet and outlet ducts for liquid; means for connecting the gas-inlet member to a source of test gas under pressure; a container surrounding the gas lift means, the inlet duct thereof passing downwardly liquid-tight through the container for dipping into a source of reactive liquid reactive with a component in the gas to be analysed, a second liquid in the container for heat exchange between the incoming gas and reactive liquid, a tank for the reactive liquid, said container being in said tank and at least partially immersed in the reactive liquid and separating the two liquids.

12. In a gas analyser, a plurality of compartments for holding liquid reactive with a component of a gas to be analysed, and having baffles to aid in maintaining the separation of liquid therein in dependence on density of various portions of the liquid, said compartments being serially connected into a closed liquid circuit; a reaction tube in one of the compartments and having an end open in the liquid and the other end for discharge into another compartment, means for introducing test gas into a part of the tube for transferring a portion of liquid from the one compartment to said other compartment, and means for detecting the extent of reaction between the gas and liquid upon passing through the tube.

13. In a gas analyser, a vessel for a reactive liquid reacitve with a component of the gas to be analysed, said vessel having a series of compartments including baffles for constraining liquid of one density to displace liquid of another density from within a compartment in an ordered sequence, the terminal compartments of the series being directly connected to each other, and means within one of the compartments for contacting liquid within said one compartment with the gas and transferring liquid from the bottom of said compartment to the top portion of liquid in an adjacent compartment.

14. An apparatus for analysis of gas mixtures and having a reaction tube open at both ends, and provided with a lateral opening near one end of the reaction tube and a second lateral opening near the other end of the reaction tube, with a gas inlet member and means for introducing the analysis gas and connected to the tube at one opening, a gas outlet member and means for drawing off the analysis gas and connected to the tube at the second opening; a storage vessel for reaction liquid from which the reaction liquid is taken, for passing through the reaction tube and to be fed back to the storage vessel, two opposed electrodes at the beginning of the reaction tube before the gas inlet and two more opposed electrodes at the end of the reaction tube behind the gas outlet, for measuring the conductivity of the reaction liquid before and after reaction with the analysis gas, the reaction tube, the means for introducing and drawing off the gas and the electrodes both being united into a complete unit, the latter dipping into the vessel containing the reaction liquid.

15. An apparatus for analysis of gas mixtures having a reaction tube and provided with a lateral opening in the reaction tube and another lateral opening near one end of the reaction tube, means for introducing the analysis gas and connected to the tube at one opening, means for drawing off the analysis gas and connected to the tube at the second opening, a storage vessel for reaction liquid from which the reaction liquid is taken, the latter passing through the reaction tube and fed back to the storage vessel, two groups of thermocouples, one being arranged at the beginning of the reaction tube before the gas inlet and the other between the gas inlet and the gas outlet, the thermocouples being in opposed connection, for measuring the difference between the temperature of the reaction liquid before and after the reaction with the analysis gas, the means for indicating the temperature difference, the reaction tube, the means for introducing and drawing off the gas and the groups of thermocouples all being united in a complete unit, the latter dipping into the vessel containing the reaction medium.

16. In a gas analyser for gas under pressure, a tank for liquid reactive with a component of the gas to be tested; a gas-lift pump in the tank and having a gas inlet member and liquid inlet and outlet ducts, the inlet duct being open to dip into the liquid; means for connecting the inlet member to a source of analysis gas, and means on the two ducts for measuring a physical change in the liquid upon passing through the pump.

References Cited in the file of this patent

UNITED STATES PATENTS

| 835,559 | Schatz | Nov. 13, 1906 |
| 2,717,774 | Obma | Sept. 13, 1955 |

FOREIGN PATENTS

| 143,341 | Great Britain | May 27, 1920 |
| 204,542 | Great Britain | Oct. 4, 1923 |
| 870,140 | France | Dec. 5, 1941 |